United States Patent [19]

Poubeau

[11] 4,300,807

[45] Nov. 17, 1981

[54] METHOD AND DEVICE FOR BALANCING ROTARY BODIES WITH PASSIVE RADIAL AND ACTIVE AXIAL MAGNETIC SUSPENSION AND FOR ORIENTING THEIR AXIS OF ROTATION

[75] Inventor: Pierre Poubeau, Le Pecq, France

[73] Assignee: Societe Nationale Industrielle Aerospatiale, France

[21] Appl. No.: 46,741

[22] Filed: Jun. 8, 1979

[30] Foreign Application Priority Data

Jun. 12, 1978 [FR] France .............................. 78 17457

[51] Int. Cl.³ .......................................... F16C 39/06
[52] U.S. Cl. ....................................... 308/10; 310/83
[58] Field of Search .................. 308/10; 310/83, 112, 310/114–117; 74/5.4

[56] References Cited

U.S. PATENT DOCUMENTS

| 2,639,394 | 5/1953 | Douglas | 310/83 |
| 3,268,749 | 8/1966 | Matsuo | 310/112 |
| 3,428,371 | 2/1969 | Lyman | 308/10 |
| 3,555,913 | 1/1971 | Martin | 74/5.4 |
| 3,845,997 | 11/1974 | Boden | 308/10 |
| 3,877,761 | 4/1975 | Boden | 308/10 |

Primary Examiner—R. Skudy
Attorney, Agent, or Firm—Karl W. Flocks; A. Fred Starobin

[57] ABSTRACT

A method and device for balancing magnetically suspended bodies wherein at the axial ends of the bodies are included two centering devices on the rotor side constituted by centered and excentric magnetic rings facing two centering devices on the stator side with centered and excentric magnetic rings, the magnetic field in the air gaps between the pairs of rings being made variable according to signals received from correction sensors of the axes and of the alignment.

26 Claims, 18 Drawing Figures

METHOD AND DEVICE FOR BALANCING ROTARY BODIES WITH PASSIVE RADIAL AND ACTIVE AXIAL MAGNETIC SUSPENSION AND FOR ORIENTING THEIR AXIS OF ROTATION

1. Field of the Invention

The problems associated with the rotation of solid bodies generally are of two types. One consists of making the axis around which the rotor rotates coincide with an axis of inertia in said body to balance it by causing the imbalances to disappear and the second is aimed at orienting the axis of rotation in a predetermined direction.

Sometimes, these two adaptations are effected conjointly when it is desired, for example in a satellite, on the one hand, to balance two momentum wheels arranged in counter-rotation on a common axis and, on the other hand, to control the perfect alignment of the kinetic moments of the momentum wheels.

In rotary bodies centered by the contact of materials such as ball bearings or pivots, balancing is achieved by the material displacement of the element of the bearing borne on the rotor side with respect to the rotor or by the addition or withdrawal of so-called balancing weights, this action having to be carried out according to the angular rotary speed of said rotary body, when the speed variation introduces modification in the position or the orientation of the axis of inertia concerned.

In the same way, these same rotary bodies experience a modified orientation of their axis of rotation if the bearings are displaced mechanically with respect to their supports assumed fixed by definition.

In practice, these operations are difficult to carry out especially in the course of rotation.

As regards magnetic bearings in which material contacts are eliminated, static and dynamic balancing may be achieved either by adjusting balance weights, or by corrections due to magnetic fields operating from sensors, said magnetic fields being also able to intervene to adapt the orientation of the above-mentioned axis of rotation.

2. Description of the Prior Art

According to the types of suspensions comprised in the invention and which have been particularly developed by Applicant, notably as disclosed in his U.S. Pat. No. 3,955,858 of May 11, 1976, and in his U.S. patent applications No. 886,496 filed on Mar. 14, 1978, now U.S. Pat. No. 4,211,452 and No. 929,077 filed on July 28, 1978 the bearings are magnetic centering rings ensuring passive radial stiffness with the normally axial magnetic field in the air gap and active axial centering is ensured by magnetic fields of coils slaved to a detector.

It should be noted that the term "magnetic centering ring" used in the present description must be taken in a particular sense.

In fact, in air gaps, which extend perpendicularly to the axis of rotation, it is rings of lines of magnetic force, hence variable in magnitude and direction as a function of the magnetic induction, which effect the coupling means, hence the radial centering means between rotor and stator.

It results therefrom that it is the pairs of rings which then procure, as material elements, the magnetic field necessary for said centering, said magnetic field being also producible in said rings by permanent magnets or again electromagnets.

In the previously mentioned systems of Applicant, the pairs of magnetic centering rings are all concentric and their number is determined by the value of the radial stiffness imposed according to the case concerned.

In these systems, the position of said pairs of magnetic centering rings fixed to the rotor defines a "rotor axis" around which said rotor rotates; that is to say when the effects of inertia are neglected, the points of this axis and these alone have a zero rotary speed and balancing consists of making the "rotor axis" coincide with the inertia axis.

In the same way, the position of said fixed magnetic centering rings on the stator defines the orientation which is imposed in space on "the rotor axis" and any variation in position imposed on said rings results correlatively in a change in orientation of said "rotor axis".

It is an object of the present invention to provide for the systems concerned, that is to say for systems including pairs of passive radial centering rings and an active axial centering device slaved to a detector, a method and a corresponding device for, when the spacings are relatively small, on the one hand, balancing their rotor by bringing its axis of rotation to the axis of inertia and, on the other hand, to orient said axis of rotation in a predetermined direction.

GENERAL DESCRIPTION OF THE INVENTION

In accordance with the invention, the pairs of magnetic centering rings are made excentric with respect to one another so that it is the above-mentioned rings of lines of force which determine, according to the value of the induction produced, the resulting centering.

In a way, on the choice of the value of magnetic induction applied to a given pair of rings, will depend the value imposed on the desired correction, whether it relates to the correction applying to the rotor axis itself with respect to the axis of inertia concerned or to its orientation in space.

Of course, the variation of induction can be produced in various ways among which it is possible to resort to: variation of the air gap, the influence of a magnetic shunt or the regulation of a current in a coil.

Other characteristics, advantages and features of the present invention will become apparent from the description given below with reference to the accompanying drawings illustrating, by way of explanation and in purely non-limiting manner, various possible embodiments of means for the application of the method according to the invention.

DESCRIPTION OF PREFERRED EMBODIMENTS

Figure 1:
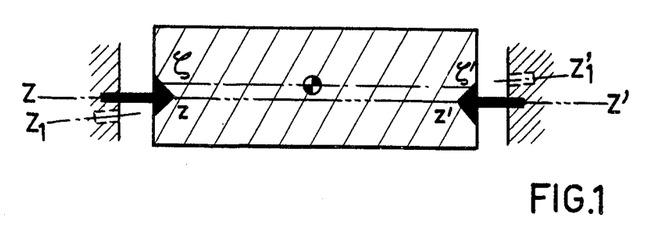
FIG. 1 is a diagrammatic sectional view, recalling the mechanical conditions of balancing and of orienting rotary bodies.

Referring to FIG. 1, it is seen that, according to the laws of mechanics, all rotating bodies have an axis of inertia $\phi-\phi'$ and a "rotor axis" $z-z'$ oriented in a direction $Z-Z'$.

The balancing of the body consists therefore of bringing into coincidence the axes $\phi-\phi'$ and $z-z'$ and of displacing the bed or seating of the bearings, on the stator side, if it is desired to obtain the required orientation $Z_1$, $Z'_1$.

Figure 2A:
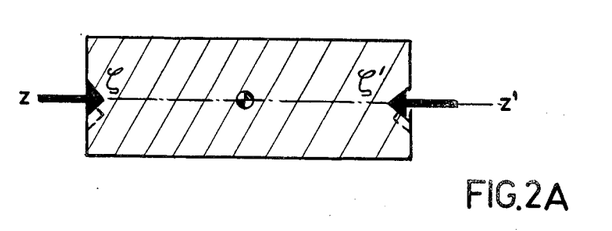
FIGS. 2A and 2B are diagrammatic sectional views showing the possible corrections of static and dynamic balancing of rotary bodies.
Figure 2B:
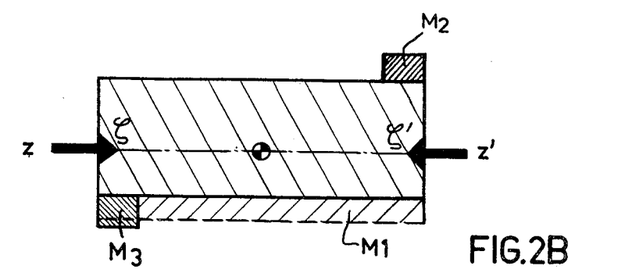

This bringing into coincidence can be achieved in two different ways: one, according to FIG. 2A, which consists of moving the bearing supports on the rotor itself, from the positions shown in a dashed line to the position in solid line; the other according to FIG. 2B, which provides for the addition (or the withdrawal) of a balancing weight $M_1$, when the axes of inertia and of the rotor are parallel, or $M_2$, $M_3$ when these axes are not parallel.

Figure 3:
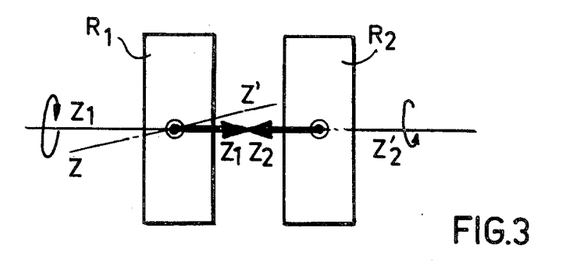
FIG. 3 is a diagrammatic view of two momentum wheels in counter-rotation.

FIG. 3 shows by way of indication, the advantage which can be offered by the change in orientation of a rotor axis $Z-Z'$ on the common axis $Z_1-Z'_1-Z_2-Z'_2$ of two momentum wheels $R_1$, $R_2$ mounted in counter rotation, on a satellite, for example.

If the systems including material connections by ball bearings or pivots of FIGS. 1, 2A and 2B can be corrected in the known manner recalled above, it is different as regards rotary bodies suspended magnetically in accordance with the invention which, themselves, can only be corrected by actions on the magnetic fields.

Figure 4:
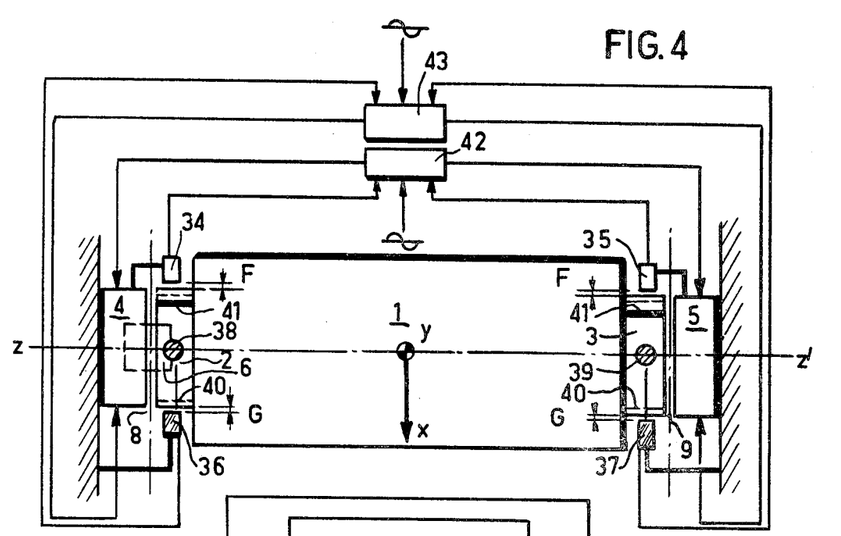
FIG. 4 is a diagrammatic view showing the means of rotation correction which can be applied, in accordance with the invention, when the rotary body is characterized by the relationship $C/A \leqq 1$, in which C is the moment of inertia around the rotary axis merged with an axis of inertia and A is the moment of inertia around the transverse axes of inertia.
Figure 5:
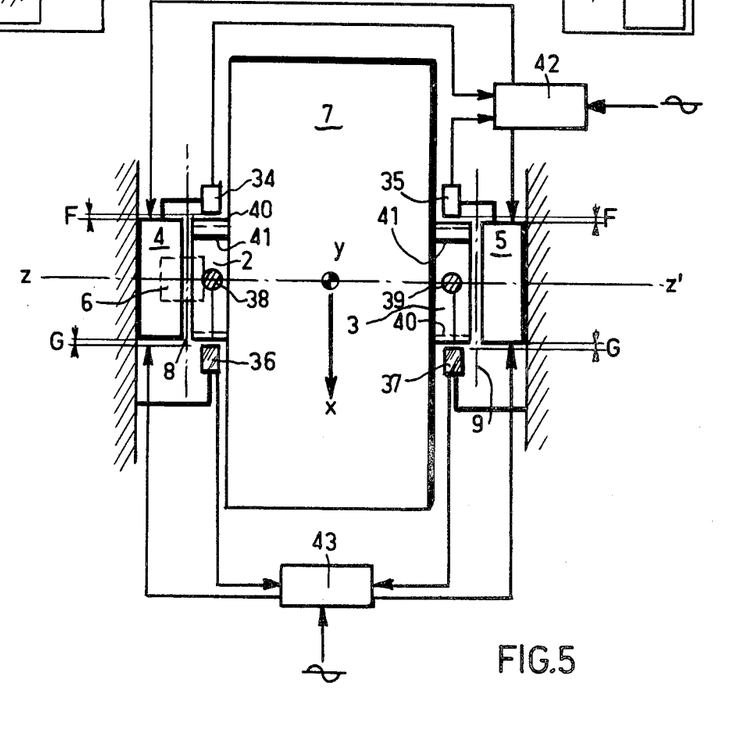
FIG. 5 is a diagrammatic view showing the rotation correction means which can be applied, in accordance with the invention, when the rotary body is characterized by the relationship $C/A \geq 1$, in which C is the moment of inertia around the axis of rotation merged with an axis of inertia and A is the moment of inertia around the transverse axes of inertia.

FIGS. 4 and 5 show the general aspects under which magnetic suspension devices within the scope of the invention are generally encountered.

In FIG. 4, the rotary body 1 is characterized by the relationship $C/A \leq 1$ and it is provided at its ends with rotor centering elements 2-3 and stator centering elements 4-5 ensuring radial inflexibility whilst an axial actuator 6 (not involving the invention) is shown diagrammatically for memory.

In FIG. 5, the rotary body 7 is characterized by the relationship $C/A \geq 1$. It is provided at its ends with rotor 2-3 and stator 4-5 centering elements of the same type ensuring radial stiffness whilst the axial actuator 6 is also shown diagrammatically for memory.

Prior to the present invention, the rings of the lines of force existing in the air gaps 8 and 9 were all concentric with the rotor axis $z-z'$, which was not necessarily in coincidence with the axis of inertia $\phi-\phi'$, which was manifested by phenomena of imbalance and of vibration encountered which had to be corrected by balancing.

In accordance with the invention, the centering elements include, on the one hand, magnetic rings centered with respect to $Z-Z'$ and, on the other hand, rings excentric with respect to $Z-Z'$, for which the magnetic induction regulation enables modification of the rings of lines of force of the air gap so that the rotor axis can be brought into coincidence with the axis of inertia and/or the axis of rotation can be brought into a predetermined direction.

Figure 6A:
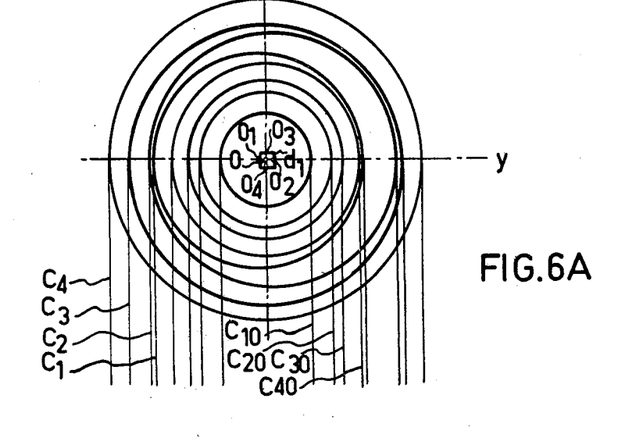
FIGS. 6A, 6B, 6C and 6D are diagrammatic views in section and viewed in a flattened plane of concentric and excentric magnetic ring centering elements for the application of the method according to the invention, it being noted that FIGS. 6A, 6B relate to stator rings and FIGS. 6C and 6D rotor rings.
Figure 6B:
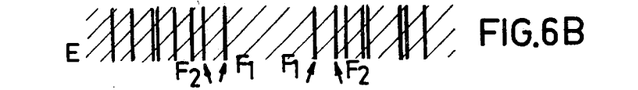

Thus, in FIGS. 6A, 6B, 6C and 6D, the region of magnetic rings and the possible orientation of the lines of force in the air gap E, are shown symbollically, In these figures, the centering element of FIGS. 6A, 6B is connected to the stator and the concentric magnetic rings of center O are arranged along $C_{10}$, $C_{20}$, $C_{30}$, $C_{40}$.

Figure 6C:
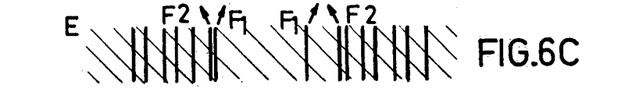
Figure 6D:
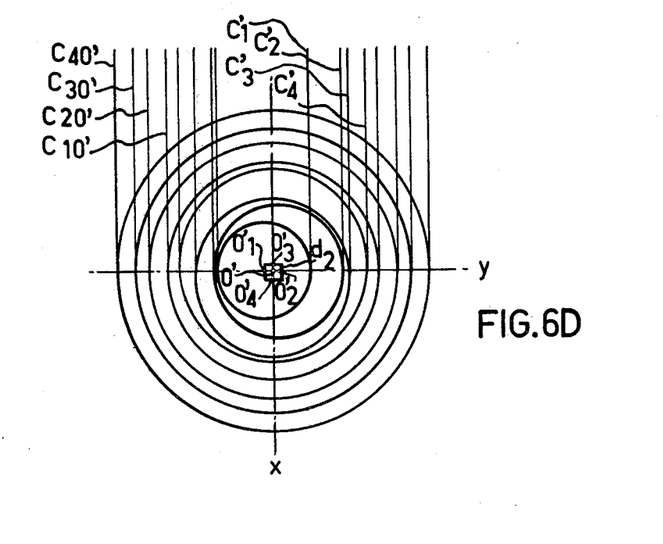

In FIGS. 6D, 6C, the centering member is connected to the rotor and the concentric magnetic rings of center $O'$ are arranged along $C'_{10}$, $C'_{20}$, $C'_{30}$, $C'_{40}$.

In FIGS. 6A, 6B, the other rings are excentric along $O_1$ for $C_1$, $O_2$ for $C_2$, $O_3$ for $C_3$ and $O_4$ for $C_4$.

In FIGS. 6D, 6C, the other rings are excentric along $O'_1$ for $C'_1$, $O'_2$ for $C'_2$, $O'_3$ for $C'_3$ and $O'_4$ for $C'_4$. The excentering of the rings, which must remain small, determines a correcting domain which is represented by a square $d_1$ in FIG. 6A and a square $d_2$ in FIG. 6D, but which could be quite different such as rectangular, for example.

At the level of the air gap the restoring forces, which are determined by the induction in the rings, define the centering according to one embodiment which will be explained below. If the two rings $C'_1$, $C'_2$ on the rotor side and $C_{10}$, $C_{20}$ on the stator side are isolated, said rings being of the same diameter but excentric along $O'_1$ for $C'_1$ and $O'_2$ for $C'_2$, the middle of $O'_1$, $O'_2$ being $O'$, it is observed that when the rotor side rings $C'_1$, $C'_2$ are held by axial slaving opposite the stator side rings $C_{10}$, $C_{20}$, they are centered according to the restoring forces shown diagrammatically by the arrows $F_1$, $F_2$ in the air gap which are exerted respectively between the two pairs of rings $C'_1$, $C'_2-C_{10}$, $C_{20}$. If the stator ring $C_{20}$ is eliminated, which corresponds to a zero radial stiffness for the pair $C'_2-C_{20}$, $O'_1$ is positioned opposite $O'$ center of the stator side rings and as a result the rotor axis then passes through $O'_1$. If, on the other hand, $C'_1$ is removed, it is $O'_2$ which is centered opposite $O'$ and the rotor axis passes, this time through $O'_2$.

If the radial stiffness of the pairs $C'_1-C_{10}$, $C'_2-C_{20}$ can be controlled from the stator, the orientation of the rotor axis and its positioning with respect to the center of gravity result therefrom and the point of passage of the rotor axis at the level of the bearing constituted by $C'_1-C_{10}$ and $C'_2-C_{20}$ can sweep the segment $O'_1$, $O'_2$.

A second set of stator side rings $C_{30}$–$C_{40}$ concentric with $C_{10}$–$C_{20}$ and two rotor side rings $C'_3$, $C'_4$ excentric for example in a perpendicular direction, of center $O'_3$–$O'_4$, act in the same way previously, so that the group of rings enables the point of the rotor axis to be moved, substantially within a square $d_2$ centered at $O'$ and whose side is equal to $O'_1$, $O'_2$ (or $O'_3$, $O'_4$).

The complete suspension of a rotary body hence necessitates two bearings with centering members and the balancing consists of adjusting the centers of rotation of the two bearings, as indicated above, so as to bring each these two points on to the axis of inertia around which the rotation must be effected, which corresponds in fact to the placing of the axes $\phi$–$\phi'$ and $z$–$z'$ in coincidence.

Such a bringing into coincidence necessitates magnetic rings or rings of concentric lines of force on the stator and excentric on the rotor and the adaptation of the inductions on the stator rings enables the $\phi \rightarrow z$ optimal stiffness, enabling the correction desired, to be determined.

Modification of the orientation of the axis of rotation is effected similarly to that which has been described above but in this case, it is the concentric rings which are on the rotor and the excentric rings which are on the stator. In a way, and according to FIGS. 6A to 6D, the concentric rings of the rotor will permit the displacement of the rotor axis or axis of rotation, in a direction determined by the magnetic fields of the excentric rings of the stator and this, in a domain of correction determined by the square $d_1$ whose side is represented by the centers $O_1$, $O_2$ (or $O_3$, $O_4$).

It is seen thus that the rotor and stator centering members which have been shown in FIGS. 6A, 6D with conjointly concentric and excentric rings, can ensure the correction of the rotor axis and of the orientation of this rotor axis at the same time.

It is obvious that it would be, a fortiori, possible to use only one correcting system on the two, without departing however from the scope of the invention.

The adaptation of the magnetic fields in the air gaps requires the modification of the magnetic inductions on the generating rings of these fields. Firstly, these magnetic fields can be generated in different ways, as for example those shown diagrammatically in FIGS. 7A, 7B; 8A, 8B and 9A, 9B. It is to be noted that, in these figures, the elements shown on the left of the axis $XX_1$, are coupled to the stator whilst the elements shown on the right of this axis $XX_1$ are coupled to the rotor.

Figures 7A, 7B:
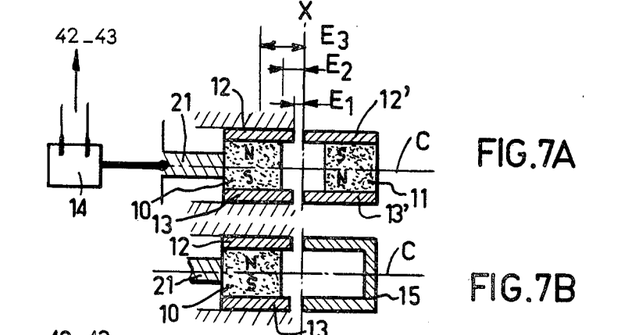
FIGS 7A and 7B are views in partial axial section showing a pair of air gap variation magnetic rings, according to two possible embodiments, for the closing of the magnetic flux.

In FIG. 7A, the lines of force C result from the action of the magnets 10, 11 with radial fields closing through ferromagnetic rings 12-13 and 12'-13' and the air gap is, in the present case, adapted according to $E_1$, $E_2$, $E_3$... by a mechanism 14 which will be described in detail below.

In a modification, in FIG. 7B, the magnet 11 connected to the rotor is replaced by a reclosing yoke 15 for the flux or return pole piece.

Figure 8A:
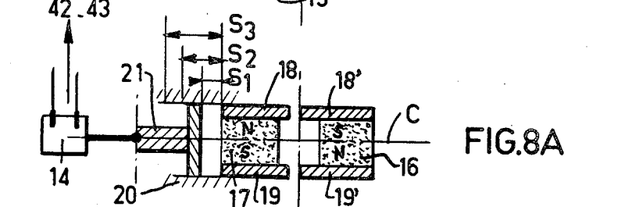
FIGS. 8A and 8B are views in partial axial section showing a pair of movable shunt magnetic rings, according to two possible embodiments for the closing of the magnetic flux.

In FIG. 8A, the lines of force C result from the operation of magnets 16, 17 with radial magnetization reclosing through ferromagnetic rings 18, 19, 18', 19' and the variation in field $S_1$, $S_2$, $S_3$, ... is generated by magnetic shunts 20 controlled by a mechanism 14 which will be also described below, the shunts 20 being on the stator portion in the same way as the rings on which they act directly.

Figure 8B:
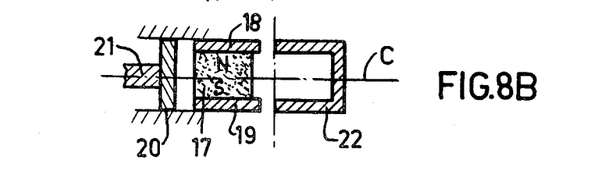

In a modification, in FIG. 8B, the magnet 16, connected to the rotor, is replaced by a reclosing yoke 22 for the flux or return pole piece.

Figure 9A:
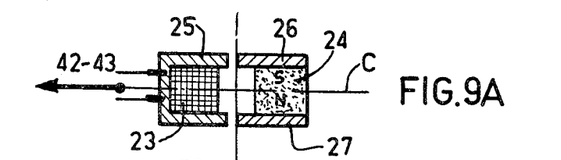
FIGS. 9A and 9B are views in partial axial section showing a pair of magnetic rings with electromagnetic variation of the flux, according to two possible embodiments, for the closing of the magnetic flux.

In FIG. 9A, the lines of force C result from the operation of a coil 23 on the stator and of a magnet 24 on the rotor and the flux is closed, on the one hand, through a coiled yoke or wound pole piece 25 and on the other hand, by ferromagnetic rings 26, 27 and through the magnet 24.

Figure 9B:
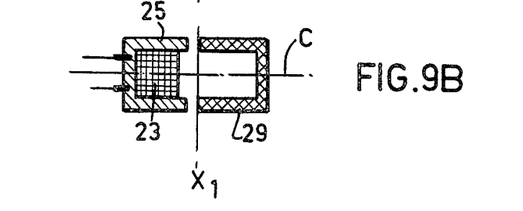

As a modification, in FIG. 9B, the magnet 24 connected to the rotor is replaced by a flux closing pole piece 29.

Figure 10:
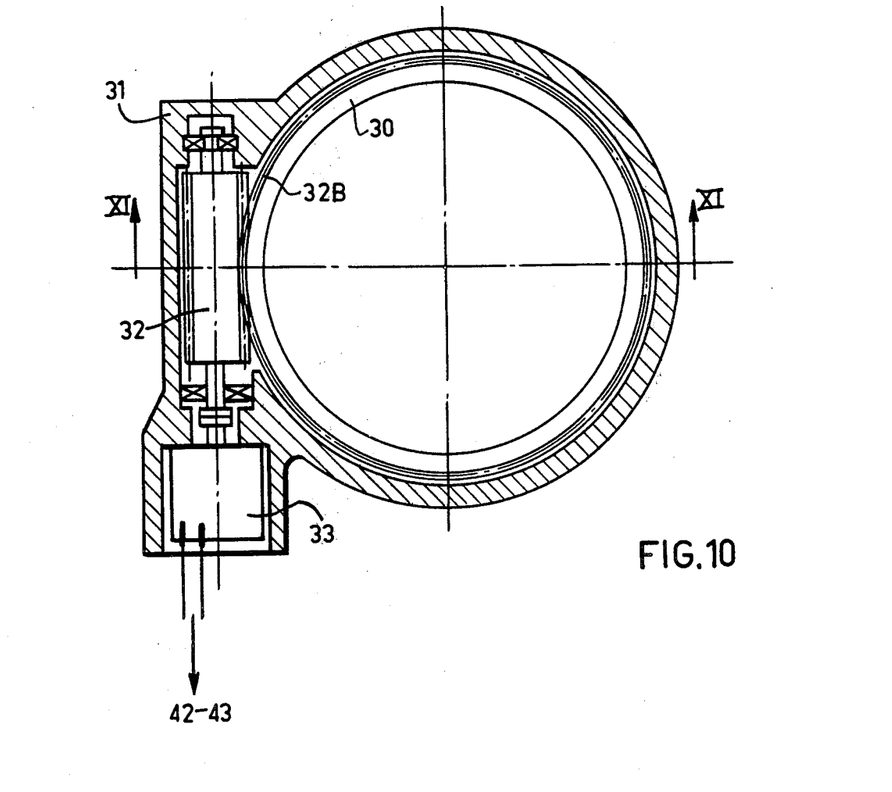
FIG. 10 is a view in radial section of a wheelworm screw mechanism to enable actuation of the rings or of the magnetic shunt.
Figure 11:
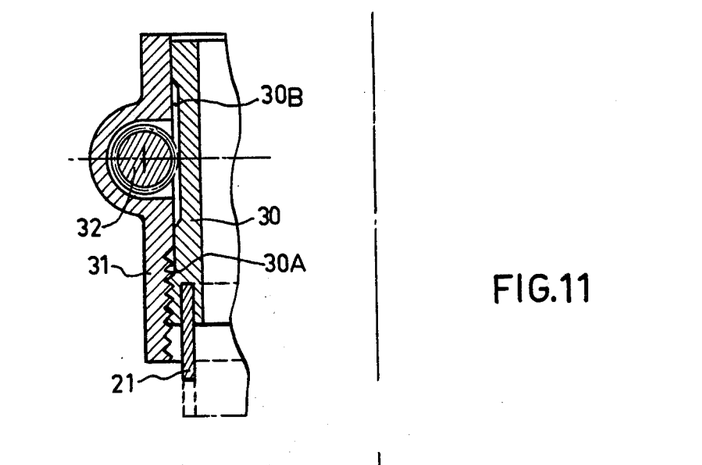
FIG. 11 is a view in partial section along the line XI—XI of the mechanism according to FIG. 10.

As regards variation in magnetic induction to be produced in the regions of the magnetic rings according to FIGS. 6A, 6B, 6C and 6D, the mechanical means 14 applicable according to FIGS. 7A, 7B and 8A, 8B, can result from the device shown by way of example in FIGS. 10 and 11. The movable parts, sliding axially in suitable circular grooves, are connected to linking rings 21 fast to a circular part 30 provided with a thread 30A engaged in the threaded portion of a body of a mechanism 31 connected to the stator.

The circular part 30 is rotated by a worm screw meshed on the tooth portion 30B so that its rotation results in its axial movement through the effect the threaded part.

A motor 33 actuating the worm screw 32 is supplied from a sensor system which will be discussed below.

It is the same for the coil current 23 which is actuated from the same sensors. The sensors which have just been discussed, have essentially two functions; one, for the correction of the axis of inertia with respect to the rotor axis and the other, for the alignment of said rotor axis in coincidence with the axis of rotation.

These sensors which can be of any suitable nature are, in the embodiment of the invention, of the "measuring systems" electromagnetic type of the U.S. company Kaman and they include a sensing head associated with an electronic circuit. They enable the position of a conducting part to be known with precision whose distance modifies the impedance of a coil situated in the head and this, within a range of the order of 1 millimeter.

The arrangement of these sensors associated with the induction variation control members on the stator magnetic rings enables the operation of the invention as emerges from FIGS. 4 and 5.

In these figures, where the centering members 2, 3 on the rotor side and the centering members 4–5 on stator side will be found, there have been arranged two sensors 34, 35 for correction of the axis and two series of two sensors each for the alignment, one 36, 37 along the x axis, the other 38, 39 along the y axis, these axes being at right angles to each other. The conducting part moving under the head of the sensors is a conducting ring 40 and the angular reference mark is provided by a slight conducting over-thickness (such as an adhesive foil 41 for example) arranged axially on said ring 40.

In a way, the signals resulting from the exploration of the space F, by the sensors 34, 35 during the rotation, are of sinusoidal shape whose amplitude is a function of the separation between the axis of inertia and the rotor axis and the angular reference marking can be reproduced on the sinusoidal signal by the reference mark 41 producing a pulse signal. These signals are applied to an integrating amplifier 42 which delivers the magnetic field modifying orders to the centering members 4, 5 which then act, according to the solution adopted, either on the motors 33, or on the coils 23 so that by data processing or by repetition, the separations are cancelled.

The alignment centering members 36, 37 at x and 38, 39 at y operate similarly in order to determine, through an amplifier 43, this space G defining along the two axes concerned x and y, the alignment of the axis of rotation of the body 1 or 7, in order to apply thereto the desired corrections.

As previously indicated, the correcting means may be applied independently or conjointly according to the expressed needs.

Thus, if the correction is only aimed at the placing of the rotor axis and the inertia axis in coincidence, the excentric rings are only on the rotor and the centered rings on the stator whereas if the correction is only aimed at orientation of the axis of rotation, it is the excentric rings which are on the stator and the centered rings on the rotor, the two systems being a fortiori applicable conjointly, in accordance with FIGS. 6A, 6B, 6C and 6D.

By way of example, for a rotor 7 according to FIG. 5 of weight 6 kg rotating at 20,000 rpm, the correction along F or G can be brought to a value less than 0.1 micron, by means of the aforementioned sensors.

It must be noted, in addition, that the energy necessary for the application of the correcting means according to the invention can be drawn from the rotation itself of the rotary body through a generator keyed to the rotary axle, which, in this case, can be considered as an "auto-correction" application of the system.

In general, the invention is directed to a method of balancing rotary bodies with passive radial and active axial magnetic suspension and of orienting their axis of rotation and it is obvious that, in this spirit, any means which could be applied, both for practicing this method and for adapting it within the scope of the invention, would remain in the spirit of this invention.

It is self-evident, in fact, that the present invention has only been described and shown by way of preferred example and that equivalents could be applied thereto, in its constituent elements without however departing from the scope of said invention, as defined in the following claims.

Thus, in particular, the invention can be applied, in the same spirit, to a magnetically suspended body but whose speed of rotation is zero in the case where it is desired to obtain only the orientation of the axis of symmetry, for example, of a seismograph.

I claim:

1. Method of balancing a rotary body with a stator, rotor and passive radial and active axial magnetic suspension and of orienting its axis of rotation, consisting of arranging at ends of said stator and rotor, pairs of magnetic rings facing each other with an air gap between them and with an axial field in said air gap, said magnetic rings being excentric on said rotor and concentric on said stator for placing in coincidence the axis of inertia with the rotor axis, said magnetic rings being concentric on said rotor and excentric on said stator for the orientation of the axis of rotation, the correction being obtained by variation of the induction on said magnetic rings of said stator.

2. Method of balancing according to claim 1, in which rings of said rotor side are excentric.

3. Method of balancing according to claim 1, in which rings of said stator side are excentric.

4. Method of balancing according to claim 1, comprising a return pole piece for the magnetic flux.

5. Method of balancing according to claim 1, comprising:
a radially magnetized annular magnet on said stator;
ferromagnetic rings enclosing said magnet;
and a mechanical means linked to said magnet for varying the separation of said air gap by axial translation of said magnet and of said rings on said stator.

6. Method of balancing according to claim 1, comprising:
a radially magnetized annular magnet on said stator;
ferromagnetic rings enclosing said magnet;
a magnetic shunt placed in front said magnet;
and a mechanical means linked to said shunt for varying the separation between said magnetic shunt and said magnet by axial translation of said shunt.

7. Method of balancing according to claim 1, comprising:
an annular magnet with radial flux on said stator;
ferromagnetic rings enclosing said annular magnet;
a return pole piece on said stator, and
a winding on said return pole piece; an adjustment of the current sent to said winding, the flux being closed on itself through said return pole piece and said rings on said stator permitting the magnetic field to be varied in the air gap between each of said centered ring and excentric ring pairs.

8. Method of balancing according to claim 1, comprising:
a return pole piece on said stator;
a flux closing return pole piece on said rotor;
a winding on said return pole piece on said stator;
an adjustment of the current sent to said winding, the flux closing through said flux closing return pole piece on said rotor, permitting the magnetic field to be varied in the air gap between each of said centered ring and excentric ring pairs.

9. Method of balancing according to claim 1, comprising an electric motor and a worm screw and thread actuated by said electric motor, in order to drive the stator ring concerned axially.

10. Method of balancing according to claim 6, comprising an electric motor and a worm screw and thread actuated by said motor, in order to drive said magnetic shunt concerned axially.

11. Method of balancing according to claim 1, comprising conducting rings fast to said rotor and fixed electromagnetic detectors which are arranged radially along the axes x and y for the alignment of the axis of rotation and in another radial direction for placing the axis of inertia and the rotor axis in coincidence at a short distance from said conducting rings to produce, by impedance detection adaptation signals of a correction control current.

12. Method of balancing according to claim 11, comprising an axial mark for producing an angular reference pulse signal.

13. Method of balancing according to claim 1 in which said rotary body is of conformation $C/A \leq 1$ in which C is the moment of inertia around the axis of rotation merged with an axis of inertia and A is the moment of inertia around the transverse axes of inertia.

14. Method of balancing according to claim 1, in which said rotary body is of conformation $C/A \geq 1$ in which C is the moment of inertia around the axis of rotation merged with an axis of inertia and A is the moment of inertia around transverse axes of inertia.

15. Apparatus for balancing a rotary body and orienting its axis of rotation comprising a stator; rotor; and passive radial and active axial magnetic suspension including pairs of magnetic rings arranged at ends of said stator and rotor facing each other with an air gap between them and with an axial field in said air gap, said magnetic rings being excentric on said rotor and concentric on said stator for placing in coincidence the axis of inertia with the rotor axis, said magnetic rings being concentric on said rotor and excentric on said stator for the orientation of the axis of rotation; and means to vary the induction on said magnetic rings of said stator to obtain a correction for the coincidence and orientation.

16. The apparatus for balancing according to claim 15, comprising one ring of said pair of magnetic rings being a yoke shaped flux closing pole piece for the magnetic flux.

17. The apparatus for balancing according to claim 15, futher characterized by
said magnetic suspension including
a radially magnetized annular magnet on said stator,
ferromagnetic rings enclosing said magnet;
and said induction varying means including
a mechanical means linked to said magnet for varying the separation of said air gap by axial translation of said magnet and of said rings on said stator.

18. The apparatus for balancing according to claim 15, further characterized by
said magnetic suspension including
a radially magnetized annular magnet on said stator,
ferromagnetic rings enclosing said magnet,
a magnetic shunt placed in front of said magnet,
and said induction varying means including
a mechanical means linked to said magnet for varying the separation between said magnetic shunt and said magnet by axial translation of said shunt.

19. The apparatus for balancing according to claim 15, further characterized by
said magnetic suspension including
an annular magnet with radial flux on said stator,
ferromagnetic rings enclosing said annular magnet,
a return pole piece on said stator,
a winding on said return pole piece,
said induction varying means including
a means of adjustment of the current sent to said winding, the flux being closed on itself through said return pole piece and said rings on said stator permitting the magnetic field to be varied in the air gap between each of said centered ring and excentric ring pairs.

20. The apparatus for balancing according to claim 15, further characterized by
said magnetic suspension including
a return pole piece on said stator,
a flux closing return pole piece on said rotor,
a winding on said return pole piece on said stator,
said induction varying means including
a means of adjustment of the current sent to said winding, the flux closing through said flux closing return pole piece on said rotor, permitting the magnetic field to be varied in the air gap between each of said centered ring and excentric ring pairs.

21. The apparatus for balancing according to claim 15, further comprising an electric motor and a worm screw and thread actuated by said electric motor, in order to drive the stator ring concerned axially.

22. The apparatus for balancing according to claim 18, further comprising an electric motor and a worm screw and thread actuated by said motor, in order to drive said magnetic shunt concerned axially.

23. The apparatus for balancing according to claim 15, further comprising conducting rings fast to said rotor and fixed electromagnetic detectors which are arranged radially along the axes x and y for the alignment of the axis of rotation and in another radial direction for placing the axis of inertia and the rotor axis in coincidence at a short distance from said conducting rings to produce, by impedance detection adaptation signals of a correction control current.

24. The apparatus for balancing according to claim 23, further comprising an axial mark for producing an angular reference pulse signal.

25. The apparatus for balancing according to claim 15, in which said rotary body is of conformation $C/A \leqq 1$ in which C is the moment of inertia around the axis of rotation merged with an axis of inertia and A is the moment of inertia around the transverse axes of inertia.

26. The apparatus for balancing according to claim 15, in which said rotary body is of conformation $C/A \geqq 1$ in which C is the moment of inertia around the axis of rotation merged with an axis of inertia and A is the moment of inertia around transverse axes of inertia.

* * * * *